US007694833B2

(12) United States Patent
Kumar

(10) Patent No.: US 7,694,833 B2
(45) Date of Patent: Apr. 13, 2010

(54) FRICTION MODIFIER APPLICATOR SYSTEM FOR TRAVELING CRANES

(75) Inventor: Sudhir Kumar, Darien, IL (US)

(73) Assignee: Tranergy Corporation, Bensenville, IL (US)

( * ) Notice: Subject to any disclaimer, the term of this patent is extended or adjusted under 35 U.S.C. 154(b) by 92 days.

(21) Appl. No.: 11/744,058

(22) Filed: May 3, 2007

(65) Prior Publication Data

US 2007/0256998 A1 Nov. 8, 2007

Related U.S. Application Data

(60) Provisional application No. 60/746,605, filed on May 5, 2006.

(51) Int. Cl.
*B60B 39/06* (2006.01)

(52) U.S. Cl. .......................................... 212/271; 291/2

(58) Field of Classification Search ................ 212/271; 291/2

See application file for complete search history.

(56) References Cited

U.S. PATENT DOCUMENTS

| | | | | |
|---|---|---|---|---|
| 2,163,953 | A * | 6/1939 | Lintern | 291/46 |
| 2,236,267 | A * | 3/1941 | Hewitt | 291/5 |
| 2,286,680 | A * | 6/1942 | Hines | 291/2 |
| 2,995,393 | A * | 8/1961 | Charp | 291/11.1 |
| 3,061,109 | A * | 10/1962 | Stone | 212/288 |
| 3,140,887 | A * | 7/1964 | Wallace et al. | 291/1 |
| 4,392,091 | A * | 7/1983 | Roberts et al. | 318/52 |
| 4,930,600 | A | 6/1990 | Kumar et al. | |
| 4,950,964 | A * | 8/1990 | Evans | 318/52 |
| 5,477,941 | A | 12/1995 | Kumar et al. | |
| 5,610,819 | A * | 3/1997 | Mann et al. | 701/20 |
| 5,896,947 | A | 4/1999 | Kumar | |
| 6,076,637 | A | 6/2000 | Kumar | |
| 6,585,085 | B1 | 7/2003 | Kumar | |
| 6,629,709 | B1 * | 10/2003 | Tunley et al. | 291/2 |
| 2005/0285408 | A1 * | 12/2005 | Eadie et al. | 291/3 |

* cited by examiner

*Primary Examiner*—Thomas J. Brahan
(74) *Attorney, Agent, or Firm*—Cook Alex Ltd.

(57) ABSTRACT

A friction management system for a traveling crane applies a liquid or solid friction modifier (FM) in precisely controlled quantities to the crane wheels or rail to improve performance and safety during movement of the crane. The friction modifier is applied by a nozzle mounted on a crane truck, which nozzle is opened and closed by a valve. The duration of the valve opening per second, which controls the friction modifier application rate, is approximately proportional to the average current draw, which is detected by current sensors connected to the truck motors.

24 Claims, 9 Drawing Sheets

FRICTION MODIFIER APPLICATOR SYSTEM FOR TRAVELING CRANES

CROSS-REFERENCE TO RELATED APPLICATION

This application claims the benefit of U.S. Provisional Application No. 60/746,605, filed May 5, 2006.

BACKGROUND OF THE INVENTION

This invention generally relates to traveling cranes. More particularly, this invention relates to systems for reducing friction during movement of a traveling crane along rails.

Portal cranes are used extensively in ports to load and unload ships and submarines. These cranes generally have a high load lifting capacity and therefore utilize double flange steel wheel trucks on heavy weight steel rails. The rails have a wide gage (up to 40 ft. or more). Depending on the load lifting capacity, portal cranes have a large number (8 to 16 or more) of two wheel trucks. One-half to one-third of the wheels are powered. Drive motors are generally located on the truck.

FIGS. 1A and 1B show a typical diagram of a modern portal crane 1 used by the U.S. Navy. A superstructure of several levels, which levels include a rotating upper works 10 connected to a system of booms, pulleys, hook hoists, steel ropes, etc. collectively designated at 15, which enables the crane 1 to pick up or lower heavy loads. The particular components of the lifting system or boom 15 will vary according to the intended use of the crane 1. The upper works 10 and boom 15 are supported by a traveling portal base 16, which is built on top of a plurality of trucks 11, 12, 13, 14. The trucks 11, 12, 13, 14 move on heavy rails 37, 38 placed with a wide gage 7. Similar cranes with smaller booms and smaller load lifting capacities are used by commercial services. There are several differences between Navy and commercial cranes but the type of trucks and wheels used in both cranes, collectively referred to herein as traveling cranes, is the same.

In Navy portal cranes, power is supplied by an on-board engine and generator typically located in the traveling portal base 16, above the trucks. Many of the other electrical and mechanical systems are located in a chamber-like structural member 28 of the crane 1. An on-board fuel tank supplies fuel for the engine. The maximum power available is thus limited to the capacity of the engine-generator combination. This power is used for several functions of the crane, including: moving the crane by powering the motors and driving the trucks; rotating the upper works to which the boom is connected; picking up and lowering the load; and changing the height of the boom.

A major fraction of the total power of both Navy and commercial cranes is used in moving the crane. Portal cranes travel on heavy gage rail track 37, 38 which is both tangent and curved in the shipyard. The track has a very wide gage 7 (12 ft to 44 ft and more) and has very sharp curves around the bay in the dock. Commercial cranes typically travel on straight or gently curved tracks. The peak power required to move the cranes depends on the sharpness of the curve. Even on tangent track, portal cranes use much more power with considerable noise and vibration than they need to.

Typical portal cranes have a large number of two wheel trucks, which operate on sharp curves. This requires some trucks to move laterally by several feet when they are on the curves. This also involves a sharp change of rolling direction of the wheels which are operating on curves. Each truck is free to rotate about its vertical axis, but the rolling direction of the truck wheels is not aligned perfectly when entering a curving rail. As illustrated in FIG. 2, the rolling direction 8 of the wheel 17 is different from the direction 9 of the curved rail 18. The angle 19 between them defines the lateral angle of slip or creep between the wheel 17 and the rail 18. The wheel 17 must slip laterally by a certain distance every moment in order to stay on the rail 18. This slip is given by the distance 20.

The greater the angle 19, the larger is the slip 20 and a corresponding lateral friction force, generally designated in FIG. 3 at 21. Hence, sharp turns result in the greatest lateral friction force. This lateral friction force 21 is opposed by an equal and opposite force 22 with which one flange 23 of the wheel 17 presses against the rail 18. It is generally not understood that an angle 19 as small as half a degree can produce lateral forces per wheel of several thousand pounds.

This force causes significant rail and wheel flange wear and can cause the flange 23 to break in extreme cases. In addition to creating an unsafe condition, replacing a wheel on one of these cranes is an expensive process. In other cases the flange 23 can climb on the rail 18, resulting in a derailment. Another problem associated with this process is the production of very high levels of noise, which compromises the safety of the workers underneath the crane because of their inability to talk to each other while the crane is moving. Other problems include excessive vibration and shock to both the electrical and mechanical drive trains and to the whole crane.

Yet another problem is that a major part of the energy of the power plant of the crane is used up in overcoming the wheel-rail contact friction in the lateral direction. At times, such a large part of the generator current is used to overcome this friction, that only one operating function of the crane can be performed at a time, otherwise the electrical system trips and blowouts can occur. For example, crane movement cannot occur simultaneously with the rotation of the upper works 10 or lifting of the load, so the capability of rotating the upper works while traveling around the curve (preferred by the operators) is compromised. Similarly, if the current draw by the truck motors is excessive, the electrical system trips and work is halted until it is fixed. This can happen in the middle of a load lift, leaving the load hanging in the air. Hence, any breakdown of the crane significantly reduces productivity and safety and should be avoided.

The above problems are only aggravated by the tendency of the wheels to stick as they slip along the rail which, when combined with the associated large lateral friction, causes the whole crane to vibrate and move jerkily. Nothing can be done about the distances slipped because they are defined by the geometry of the wheel and the rail. Therefore, the only way to reduce the detrimental wastage of crane energy is to reduce the friction force 21 between the wheels 17 and the rail 18.

Accordingly, a general object and aspect of the present invention is to provide a system whereby the above friction-related problems of prior art traveling cranes are substantially reduced or eliminated.

Other aspects, objects and advantages of the present invention, including the various features used in various combinations, will be understood from the following description according to preferred embodiments of the present invention, taken in conjunction with the drawings in which certain specific features are shown.

SUMMARY OF THE INVENTION

The present invention is designed to solve the above-described problems with traveling cranes that cause them to not perform optimally with respect to: (1) maximum productivity capacity, (2) maximum safety, (3) smooth uninterrupted operation with simultaneous multifunctional ability, and (4) wheel flange/rail wear and durability. The present invention reduces or eliminates the above problems by reducing the root cause of these problems, which is the development of excessive lateral friction between the crane wheel and the rails, by use of an automatic, computer-controlled friction modifier applicator system.

According to one aspect of the present invention, a friction modifier applicator system for use with a traveling crane has a nozzle mounted on a truck. The nozzle is oriented to spray a friction modifier on the tread and opposing flanges of a wheel and/or on the rail. The friction modifier is supplied to the nozzle by a hose, while a valve controls the release of the friction modifier from the nozzle. A sensor measures a performance value of the truck, which performance value is used by a controller to actuate the valve.

According to another aspect of the present invention, a friction modifier applicator system for use with a traveling crane has a nozzle mounted on a truck. The nozzle is oriented to spray a friction modifier on a wheel and/or the rail. The friction modifier is supplied to the nozzle by a hose, while a valve controls the release of the friction modifier from the nozzle. A sensor measures current draw of the truck and a controller actuates the valve according to the current draw.

According to yet another aspect of the present invention, a friction modifier applicator system for use with a traveling crane having four corners includes a nozzle mounted on each corner truck. The nozzles are oriented to spray a friction modifier on the tread and opposing flanges of a wheel of the associated truck. The friction modifier is supplied to the nozzles by hoses, while each nozzle includes a valve that controls the release of the friction modifier. A sensor associated with each truck measures current draw of the truck and a controller uses the average current draw of each truck to actuate the valve associated with that truck.

DETAILED DESCRIPTION OF THE INVENTION

This invention is a friction management system for improving productivity, safety and operation of traveling cranes, in particular portal cranes, by applying a liquid or solid friction modifier (FM) in precisely controlled quantities to the wheel tread and flanges of one or more wheels of the lead trucks. This reduces the lateral forces, high current draw trips, and high noise levels and improves productivity through increased capacity for number of lifts with the crane.

Figures 1A, 1B:
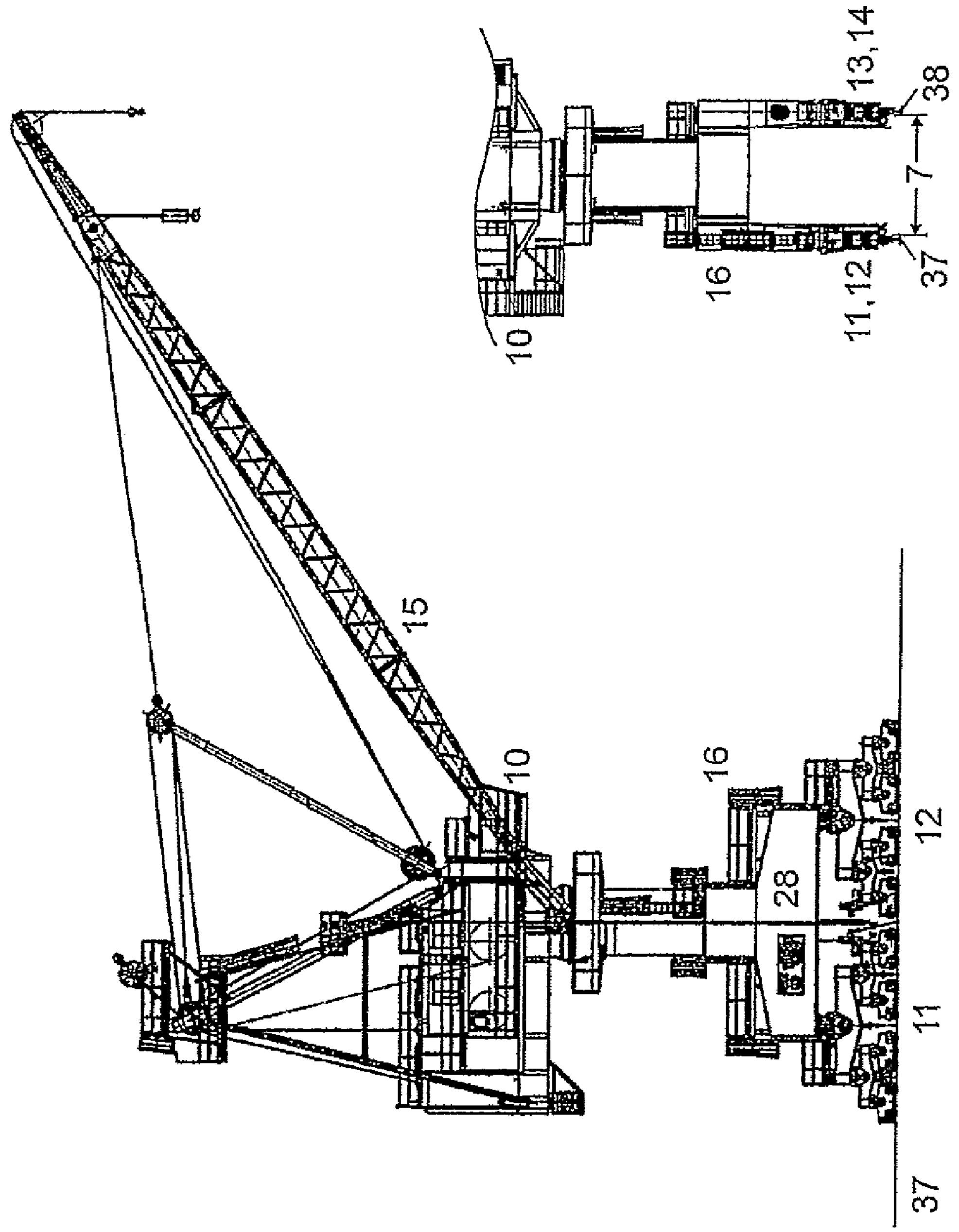
FIG. 1A is a side elevation view of a typical portal crane, showing the essential components.
FIG. 1B is an end elevation view of a typical portal crane.
Figure 2:
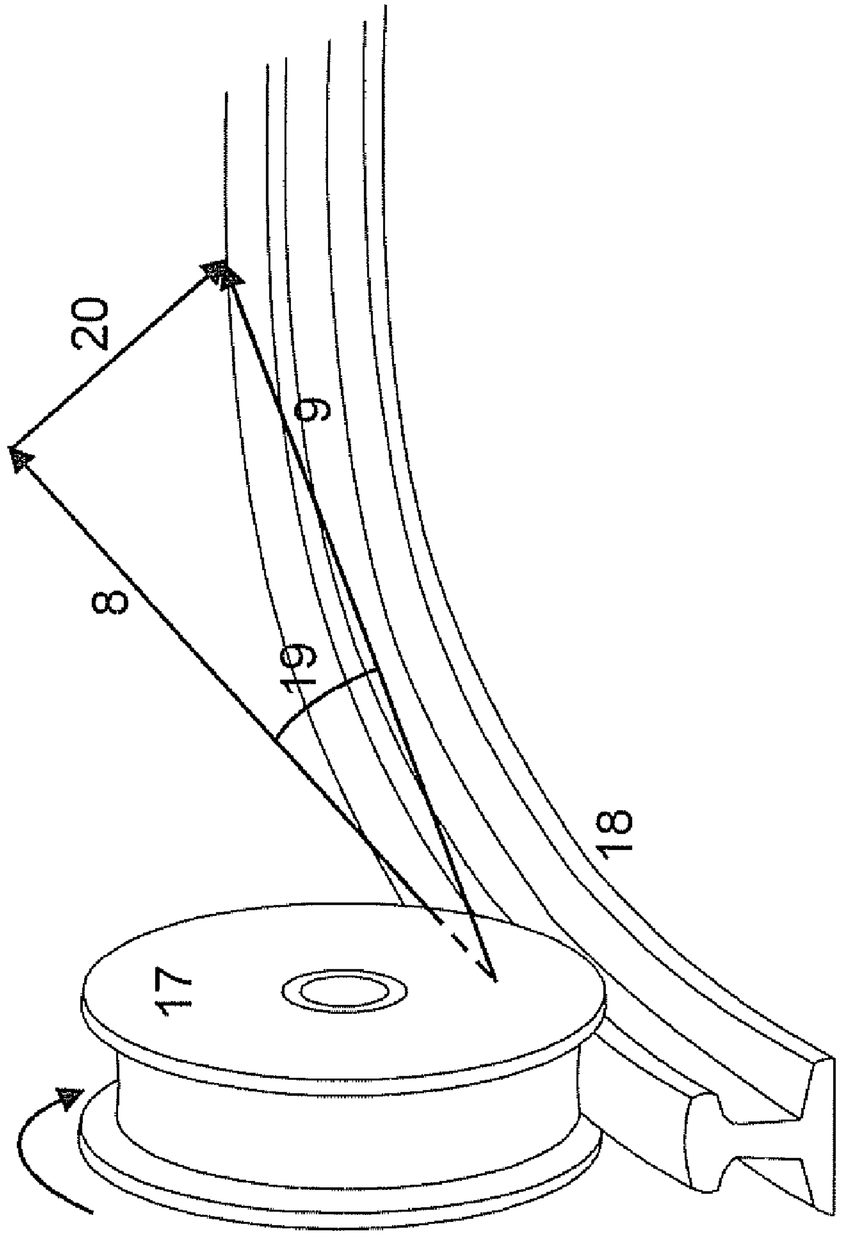
FIG. 2 is a perspective view of a two-flanged crane wheel on a sharp curved rail, showing the angle of attack.
Figure 3:
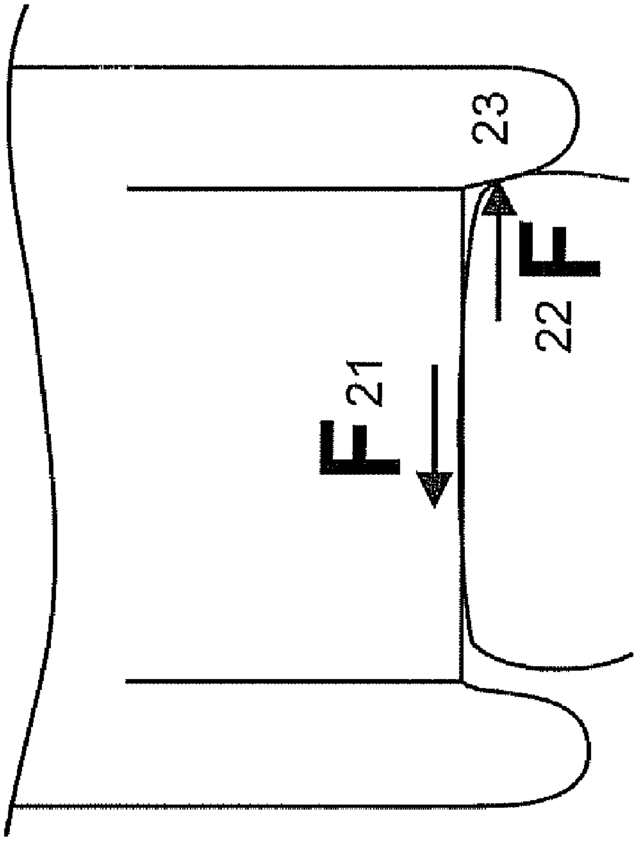
FIG. 3 is an end view of a single, double-flanged crane wheel on a curved rail, showing the lateral creep force 21 which produces a large force 22 on the wheel flange.
Figure 4:
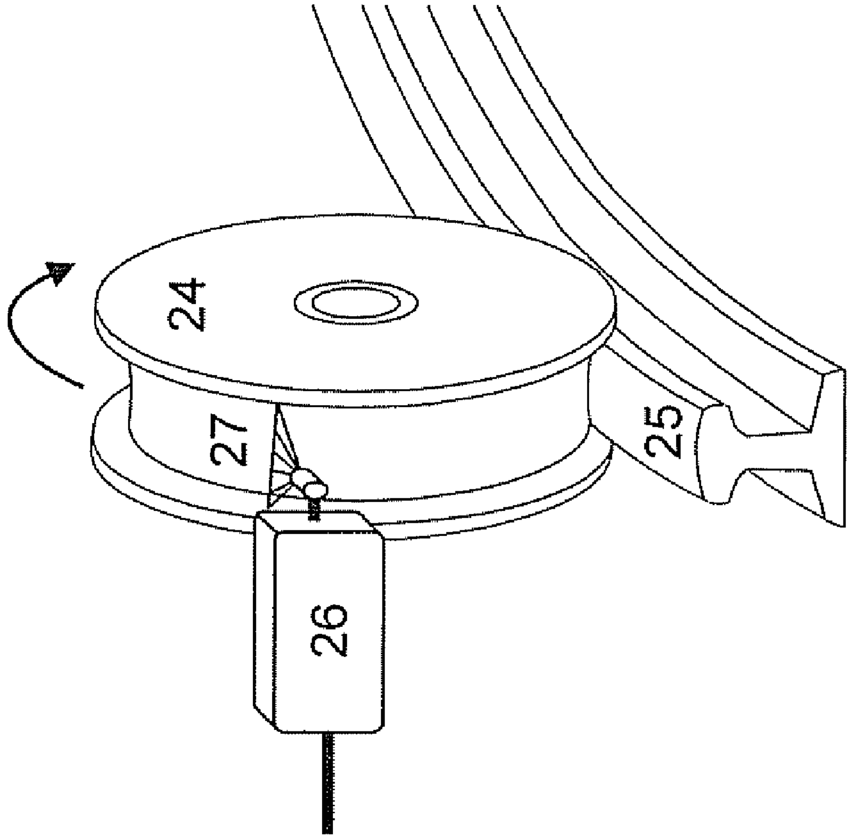
FIG. 4 is a perspective view of a friction modifier V-jet spray being applied to the crane wheel on a curved rail.

FIG. 4 shows a crane wheel 17 on a curved rail 18. A friction modifier applicator system, generally designated at 24, includes a solenoid-controlled valve (not shown) and a V-jet nozzle 25. The nozzle 25 is placed at an appropriate distance such that that the spray 26 covers the wheel tread 27 and the two flanges 23. The flat V-shaped spray 26 is applied intermittently by computer control for a specified duration. The FM applied to the wheel 17 transfers to the rail 18 in the region of wheel-rail contact and is then transferred to the tread and flanges of the following wheels. Thus, the contact friction of all wheels with the rail 37, 38 at the curved portion 18 is reduced, resulting in the dramatic reduction of both forces 21, 22 and of the total energy consumed by the wheels and the crane during movement. While FM application to the wheels is the preferred way to accomplish this task, partial benefits can be obtained by using the present invention to direct the FM application jet on the rail head instead of, or in addition to, the wheels.

Smooth flowing friction modifier fluid is preferred over solid or slurry because the application rate can be controlled accurately and also because this smooth fluid covers and penetrates the rough surfaces more completely. At least one set of nozzles/applicator is installed on the lead wheel of the lead trucks for FM application to the wheel tread and the two flanges. The pressurized fluid FM is preferably provided to the nozzles 25 equipped with solenoid-controlled valves. Pressure may be developed by a pump, pressurized tank or other means. The FM application is preferably in the form of a V-jet aimed in such a way that the whole tread 27 and both flanges 23 of the wheel 17 are coated by the spray 26. Other jet types and multiple jets may also be used, although they are not preferred.

The rate of application of FM may be controlled by changing the duration of the valve opening in each second. For the efficient use of FM, the nozzles 25 may be installed on the lead and trailing trucks. However, nozzles may be installed on each truck without departing from the scope of the present invention. To reduce FM wastage, the trailing truck nozzles may be shut off during forward movement of the crane by using current sensors on truck motor current wires to determine the direction of movement of the crane. The duration of valve opening, which controls the FM application rate, may be increased or decreased as the current draw changes. Fluid tanks, either equipped with pumps or pressurized, may be located above the lead and trailing trucks, as illustrated in FIGS. 5 and 6, or at the upper level inside the crane body, as illustrated in FIG. 7.

The application rate control can be achieved in several discrete steps, according to an example described herein, or as a continuous function. By this method, just enough FM is applied for the above benefits to the crane without any loss of traction.

Figure 5:
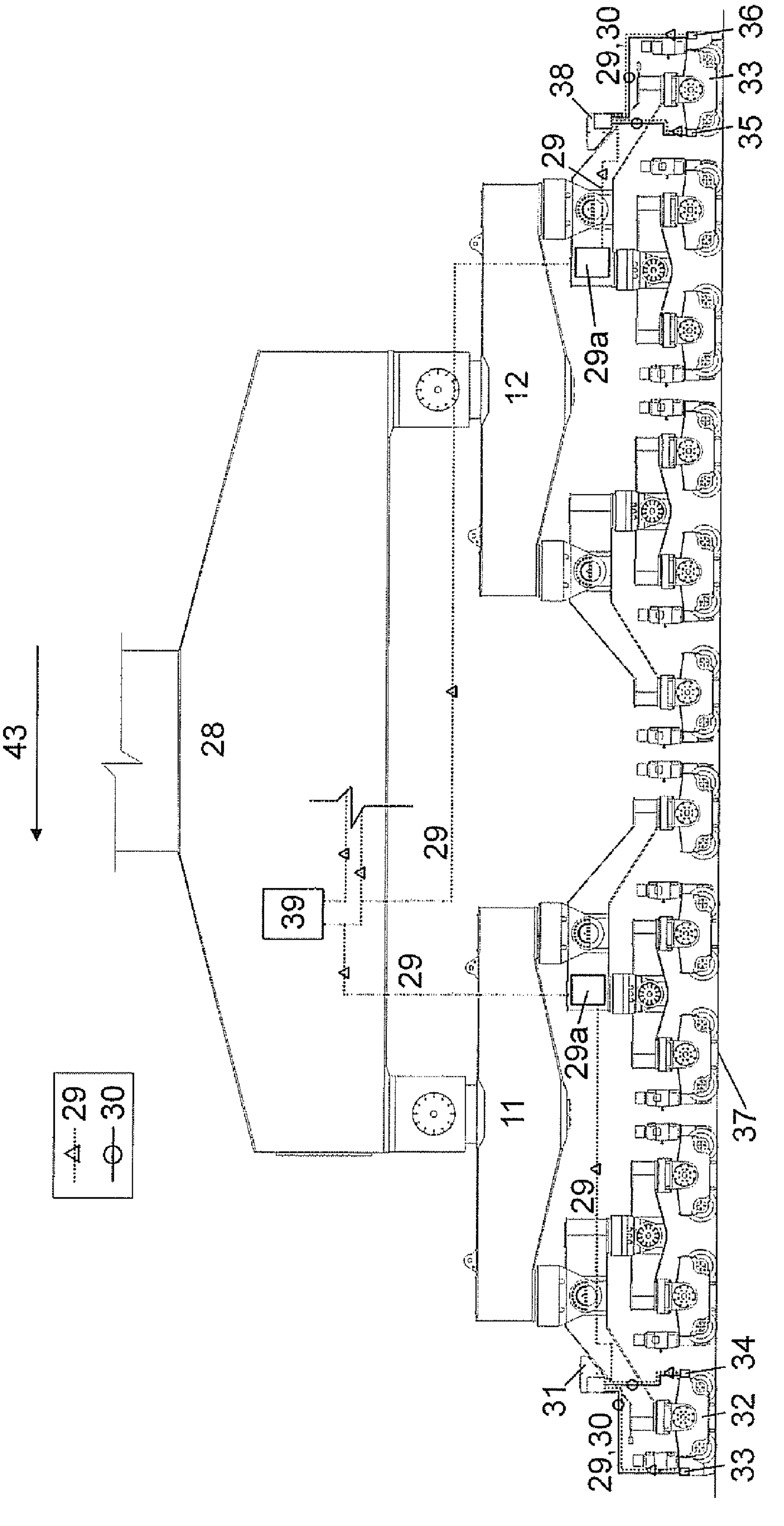
FIG. 5 is a side elevation view of the crane lower structure and trucks, with fluid tanks and nozzles of an automatic wheel-rail friction modifier applicator system mounted on corner trucks.

FIG. 5 shows a side view of the lower crane structure including the trucks supporting the crane. It also shows a preferred placement of the various components of the friction modifier applicator system. The illustrated lead and trailing trucks, generally designated at 32*a* and 32*b* respectively, are equipped with solenoid valve nozzles 33, 34, 35, 36, which are supplied with the pressurized friction modifier from tanks or containers 31. FIG. 5 illustrates two corners of the crane and two corner trucks 32*a*, 32*b*, but it will be appreciated that the crane has four corners and is supported by a corner truck at each corner. Preferably, each corner truck is configured according to the following description.

Figure 6:
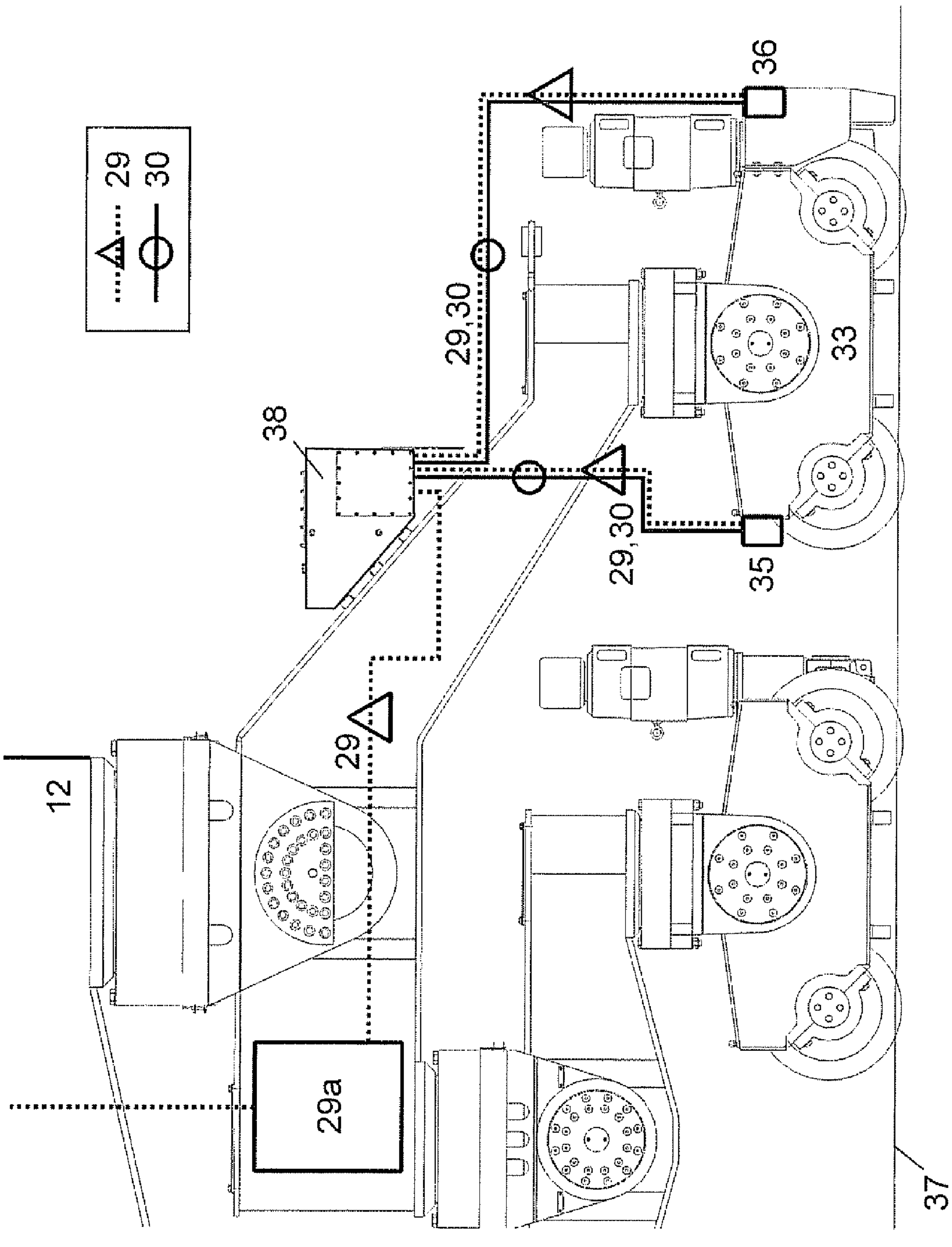
FIG. 6 is an enlarged, detail view of one corner of the crane, showing a corner truck with a tank and two nozzle placements.
Figure 7:
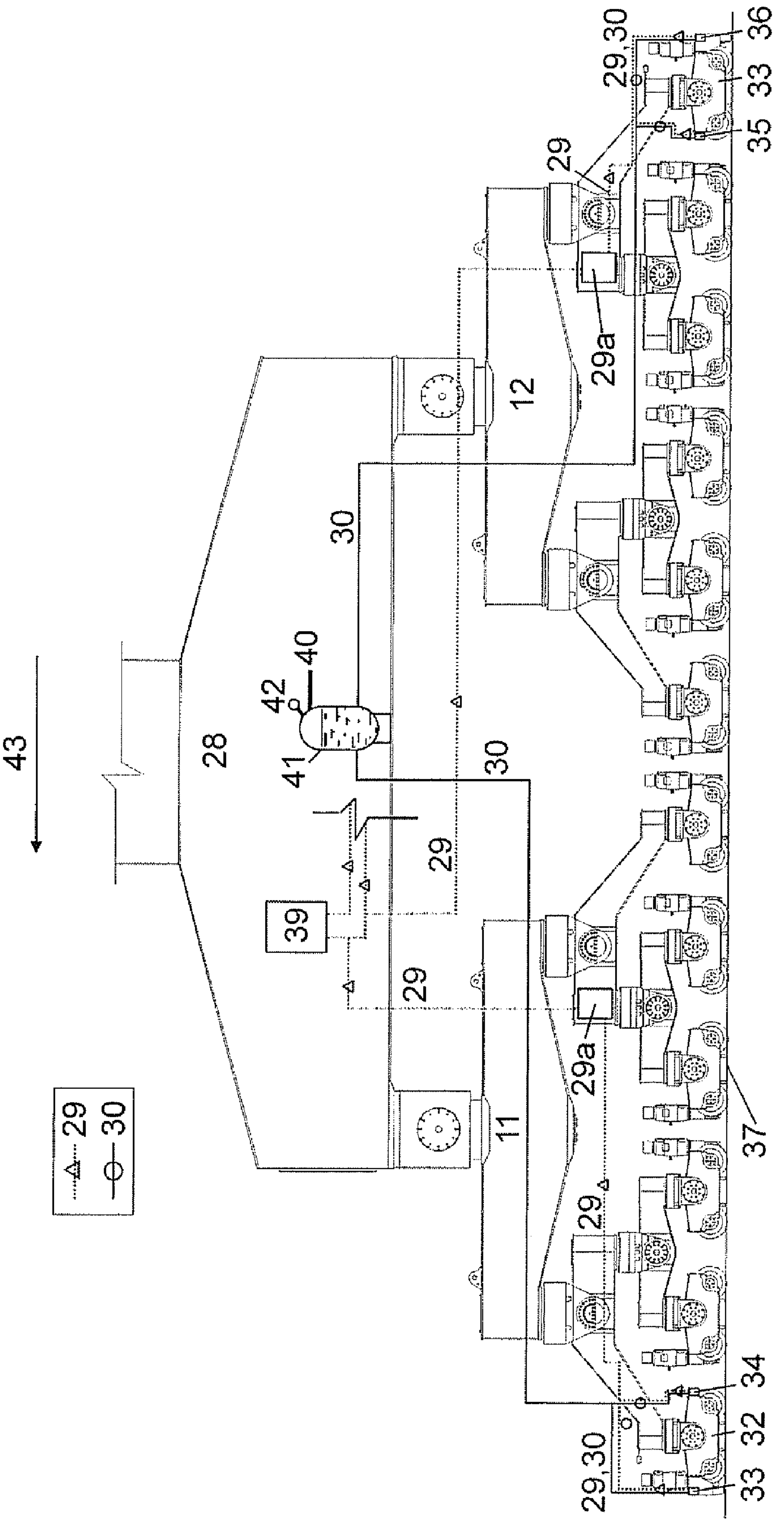
FIG. 7 is a side elevation view of the lower crane structure, illustrating an alternate embodiment using a central pressurized fluid tank delivering fluid to nozzles on each corner truck.

As illustrated in FIGS. 5 and 6, each corner truck preferably includes a pair of nozzles for spraying both wheels of the truck. Hydraulic lines/hoses 30 connect the tanks 31 with the friction modifier to the solenoid valve nozzles 33, 34, 35, 36. The opening and closing of the solenoid valves is preferably controlled by a controller 39 through electrical lines 29 located in the chamber 28. A junction box 29*a* may be used in the lines for convenient connection. As noted by the legend in FIG. 5, electric lines 29 are indicated in the figure by a triangle and hydraulic lines are denominated by a small circle.

The direction of motion of the crane is shown by an arrow 43. For this motion, the nozzles 33, 34 of the lead truck 32*a* are activated to apply the friction modifier to the wheels. Preferably, each electrical line supplying power to a truck motor includes a sensor for measuring the current draw and direction of travel of the truck, which are used to determine the amount of FM applied by the nozzles, as described below. The nozzles 35, 36 of the trailing truck 32*b* do not operate during forward movement of the crane, i.e., movement in the direction of arrow 43. The FM applied to the wheels by nozzles 33, 34 is then transferred to the rail 37, 38. It then modifies the friction for all the wheels of the trailing trucks. Of course, if the crane is moved in the opposite direction, then truck 32*b* becomes the leading corner truck, in which case its nozzles 35, 36 are actuated by the controller 39 and the nozzles 33, 34 of the now-trailing corner truck 32*a* are preferably closed to conserve FM.

FIG. 6 shows an enlarged, detail view of one corner truck 32*b* with preferred tank 31 and nozzle 35, 36 placements. Preferably, each of the four corner trucks is configured according to the embodiment of FIG. 6. The electrical line 29 connects the solenoid valve nozzles 35, 36, through the connector box 29*a*, with the controller 39 of FIG. 5. The nozzles 35, 36 preferably apply the FM to the wheels 17 of the truck 32*b*, which is transferred to the rail 37, 38. A part of the structure 2 of the crane through which the load is transmitted to the trucks is shown at the top of FIG. 6.

FIG. 7 shows an alternative system arrangement using a central pressurized fluid tank instead of four separate smaller tanks 31 located above each corner truck as discussed earlier. One or two larger fluid tanks 41 are placed in the crane, preferably within the upper structure chamber 28. The fluid tank 41 may be pressurized with compressed air 40 available from the diesel engine-powered compressor of the crane, generally located at the same level 28. A pressure regulator 42 installed on the tank 41 regulates its pressure. In this arrangement both electrical 29 and hydraulic 30 lines are relatively long, compared to the embodiment of FIGS. 5 and 6, starting in the upper chamber 28 and terminating at the nozzles. The rest of the components and their placements are the same as shown in FIGS. 5 and 6.

Figure 8:
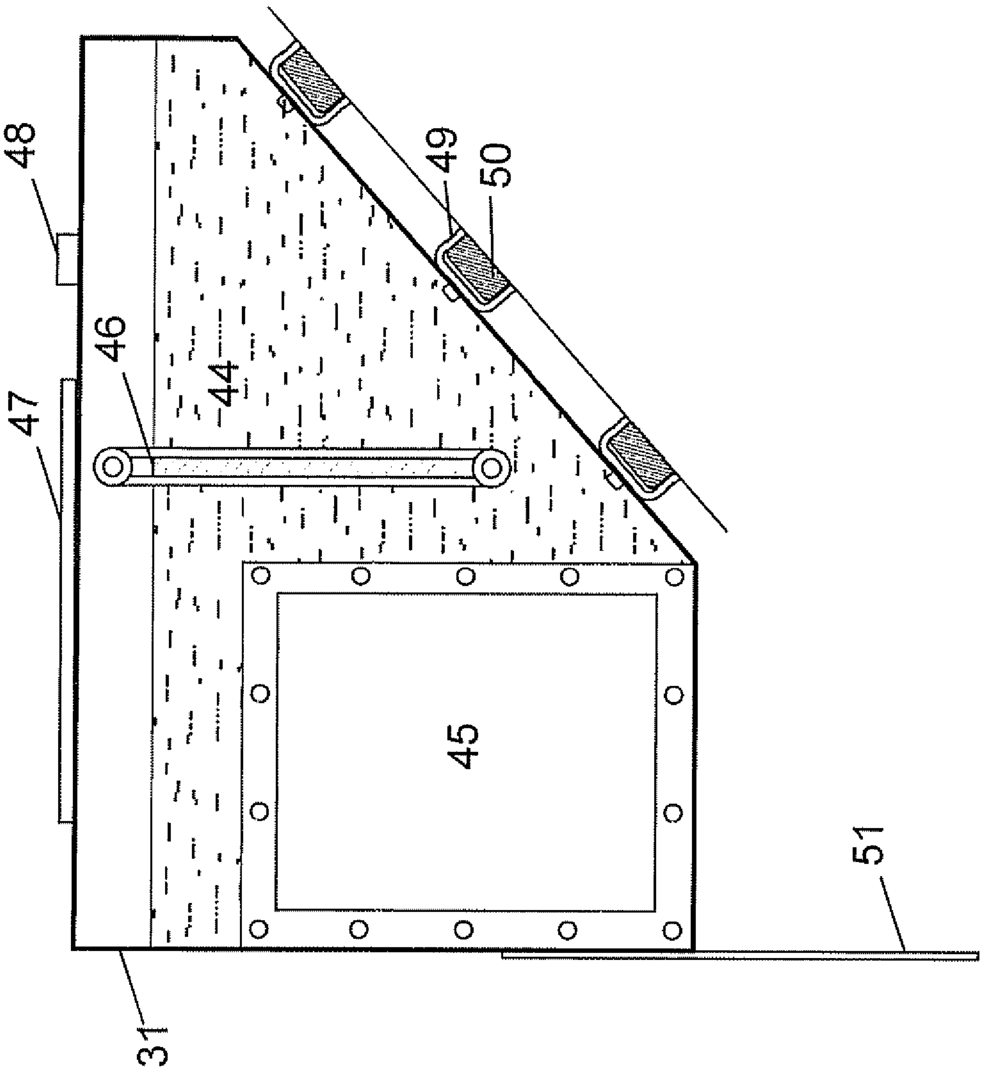
FIG. 8 is a diagrammatic side view of a tank with two parts, one carrying the fluid and the other the pumping system.

FIG. 8 is a diagrammatic view of one tank 31 design suitable for placement at each corner of the crane. This shape was found to be suitable for fitting and placing the tank 31 in the space cavity available above the corner trucks of existing cranes. This shape can be changed to fit other crane designs without departing from the scope of the present invention. Two basic chambers need to be present in all such tanks. One chamber 44 carries the FM and the other chamber 45 carries the pumping system. A sight gage 46 is useful for checking the FM level to know when the tank 31 needs filling. Structural support and securing the tank 31 in this design is achieved with slides 49, 50 and a tie down 51, to reduce the vibration. A tank clean out cover 47 and a fill port 48 may be located on top.

Figure 9:
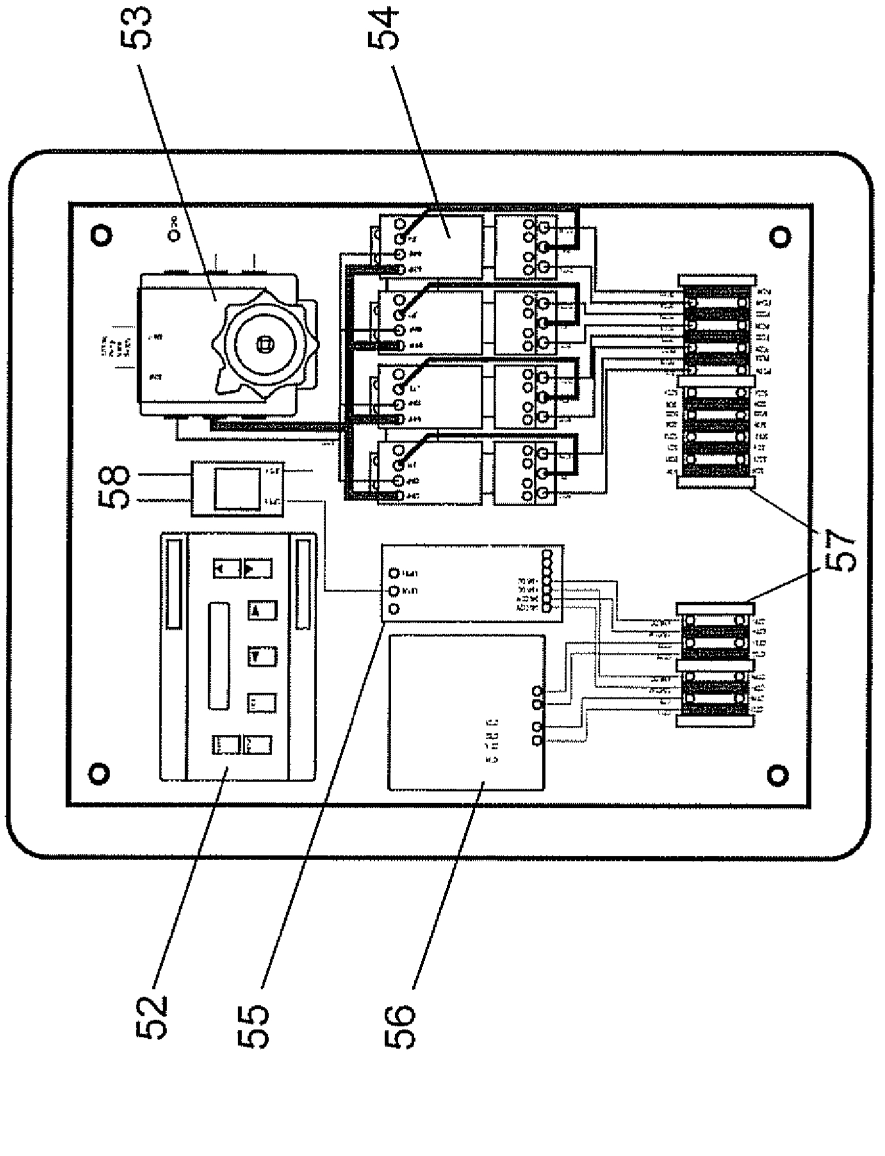
FIG. 9 is a side elevation view of a controller box showing the computer, relays and safety locks and related equipment.

FIG. 9 shows one arrangement of the computer control components. The controller 39 can be provided with different arrangements to suit the requirements of the user. It preferably has several basic components, in addition to electrical power 58 to operate the controller 39 and the components. The first component is a computer 52 with the ability to accurately compute in real time the duration for which the nozzles should apply FM in each second. Preferably, a power supply 55 is included to provide the correct voltage to operate the computer 52 and other components. The controller 39 may also include motor protection modules 54 to protect the motors of the pumping systems. Other preferred components include a sensor interface 56 for the current sensors installed on the crane to measure the current draw by the truck motors, an electrical breaker 53, and terminal blocks 57 for proper connections.

The control logic of the invention is as follows. Portal cranes are moved through the dock area at a slow, steady speed typically between 2 and 3 miles per hour. The amount of current draw of the truck motors is directly dependent on the rolling friction of the crane wheels. However, the current draw generally shows fluctuations and oscillations, so it may be preferable to average the current draw. The average current draw of the truck motors is nearly steady and also directly dependent on the rolling friction of the crane wheels. For this reason, the average current draw is a good measure of the energy being consumed in wheel friction. As the amount of FM that needs to be applied to maintain low lateral friction of the wheels on curves is also directly related to the energy consumed in wheel friction, the rate of FM application may be expressed as a function of the average current draw, which can be a linear function or a power function. This will also depend on the characteristics of the FM.

The control can also be done in steps. This is somewhat preferable when functionality of relationship is not fully established. One example of such a stepwise control function is shown below in Chart 1.

CHART 1

| Zone | Total Current Load (A1 + A2) AMPS | Nozzle Open Duration ms |
|---|---|---|
| 0 | <20 | 0 (OFF) |
| 1 (A) | 20-40 | 40 |
| 2 (B) | 40-80 | 80 |
| 3 (C) | 80-120 | 120 |
| 4 (D) | >120 | 160 |

Chart 1 shows five discrete zones of control in the first column. For each zone there is a corresponding range of total current load (second column), which in this case is the sum of electrical readings from two current sensors reading the current draw of the motors on the front half A1 and another one for the trailing half A2 of the motors. The third column shows the nozzle open duration in milliseconds which determines the rate of application of the FM every second. Thus, the amount of FM applied per second increases with the current load on the motors. In a preferred embodiment, the current sensors also determine the direction of movement of the crane and FM is only applied to the wheels of the foremost or leading trucks. In most cases, the operation of the crane will be in the first two zones (0 and 1(A)) and only occasionally will the operation turn to Zone 2 (B). It will be appreciated that actuation of the nozzles may be carried out by a continuous function or a different stepwise function without departing from the scope of the present invention.

The nozzles of each truck are preferably actuated independently of each other, such that the wheels or rail associated with each truck is treated according to its unique needs. Accordingly, the operation illustrated in Chart 1 is preferably carried out separately for each truck outfitted with a spray nozzle. When properly lubricated, the crane will operate with significantly reduced noise, typically a decrease in the range of 20 decibels, and high current trips will be substantially eliminated, without compromising the traction of the wheels.

It will be understood that the embodiments of the present invention which have been described are illustrative of some of the applications of the principles of the present invention. Numerous modifications may be made by those skilled in the art without departing from the true spirit and scope of the invention, including those combinations of features that are individually disclosed or claimed herein. For these reasons, the scope of the invention is not limited to the above description but is as set forth in the following claims.

I claim:

1. A friction modifier applicator system for use with a traveling crane supported by a plurality of trucks having wheels movable along rails, the friction modifier applicator system comprising:

- a nozzle mounted on a truck and oriented to spray a friction modifier on one of a wheel of the truck and a rail engageable with the wheel;
- a valve in fluid communication with the nozzle;
- motors in driving relation with at least two of the trucks;
- a sensor for measuring the current draw of the truck motors; and
- a controller for actuating the valve according to a measured performance value of the truck, the measured performance value being only the average current draw of the truck motors.

2. The friction modifier applicator system of claim 1 wherein the controller actuates the valve according to a stepwise function.

3. The friction modifier applicator system of claim 1 wherein the controller actuates the valve according to a continuous function.

4. The friction modifier applicator system of claim 1 wherein the crane includes four corner trucks and the nozzle is mounted on one of the corner trucks.

5. The friction modifier applicator system of claim 4 further comprising a friction modifier container mounted generally above one of the corner trucks, the friction modifier container being connected in fluid communication with the nozzle.

6. The friction modifier applicator system of claim 5 wherein the friction modifier container comprises a pump.

7. The friction modifier applicator system of claim 1 wherein the nozzle is oriented to spray a tread and opposing flanges of a wheel.

8. The friction modifier applicator system of claim 1 wherein the controller actuates the valve according to only the average current draw of the truck motors and the direction of travel of the trucks.

9. A friction modifier applicator system for use with a traveling crane supported by a plurality of trucks having wheels movable along rails, the trucks including drive motors for driving the wheels, the friction modifier applicator system comprising:

- a nozzle mounted on a truck and oriented to spray a friction modifier on one of a wheel of the truck and a rail engageable with the wheel;
- a hose providing the friction modifier to the nozzle;
- a valve in fluid communication with the hose and nozzle;
- a sensor for measuring current draw of the truck drive motors; and
- a controller for actuating the valve according to a measured performance value of the truck, the measured performance value being has been inserted only the average current draw of the drive motors.

10. The friction modifier applicator system of claim 9 wherein the nozzle is oriented to spray the friction modifier on a tread and opposing flanges of the wheel.

11. The friction modifier applicator system of claim 9 wherein the controller actuates the valve according to a stepwise function.

12. The friction modifier applicator system of claim 9 wherein the controller actuates the valve according to a continuous function.

13. The friction modifier applicator system of claim 9 wherein the crane includes four corner trucks and the nozzle is mounted on a corner truck.

14. The friction modifier applicator system of claim 13 further comprising a friction modifier container mounted generally above one of the corner trucks, the friction modifier container being connected to the hose.

15. The friction modifier applicator system of claim 9 wherein the controller actuates the valve according to only the average current draw of the drive motors and the direction of travel of the trucks.

16. A friction modifier applicator system for use with a traveling crane having four corners, each corner supported by a corner truck having wheels movable along rails, the trucks including drive motors for driving the wheels, the friction modifier applicator system comprising:

- a nozzle mounted on each corner truck and oriented to spray a friction modifier on a tread and opposing flanges of a wheel of the associated corner truck;
- a hose associated with each nozzle for providing the fraction modifier to the associated nozzle;
- a valve in fluid communication with each hose and nozzle;
- a sensor associated with each corner truck for measuring current draw of the drive motor of the associated corner truck;
- means for sensing the direction of travel of the corner trucks; and
- a controller for actuating each valve according to only the average current draw of the associated corner truck's drive motor and the direction of travel of the corner trucks.

17. The friction modifier applicator system of claim 16 wherein each corner truck includes a pair of nozzles.

18. The friction modifier applicator system of claim 16 wherein the friction modifier is not released by the nozzles associated with the trailing corner trucks.

19. The friction modifier applicator system of claim 16 further comprising a friction modifier container mounted at each corner of the crane, wherein each friction modifier container is connected to at least one of the hoses.

20. The friction modifier applicator system of claim 16 wherein the controller actuates each valve according to a stepwise function.

21. The friction modifier applicator system of claim 16 wherein the controller actuates each valve according to a continuous function.

22. The friction modifier applicator system of claim 16 wherein the nozzles are actuated independently of each other.

23. A friction modifier applicator system for use with a traveling crane supported by a plurality of trucks having wheels movable along rails, the trucks including drive motors for driving the wheels, the friction modifier applicator system comprising:

a nozzle mounted on a truck and oriented to spray a friction modifier on a driven wheel of the truck;

a tank mounted on one of the crane and a truck for containing friction modifier;

a hose providing fluid communication from the tank to the nozzle;

a valve in fluid communication with the hose and nozzle;

a sensor associated with each drive motor for measuring the current draw of the associated drive motor; and a controller for actuating the valve according to a measured performance value of the truck, the measured performance value being only the average current draw of the drive motors.

24. The friction modifier applicator system of claim 23 wherein the controller actuates the valve according to only the average current draw of the drive motors and the direction of travel of the trucks.

* * * * *